P. R. McCRARY.
PROCESS OF MAKING DRAIN TILES.
APPLICATION FILED DEC. 11, 1918.
1,314,279.
Patented Aug. 26, 1919.
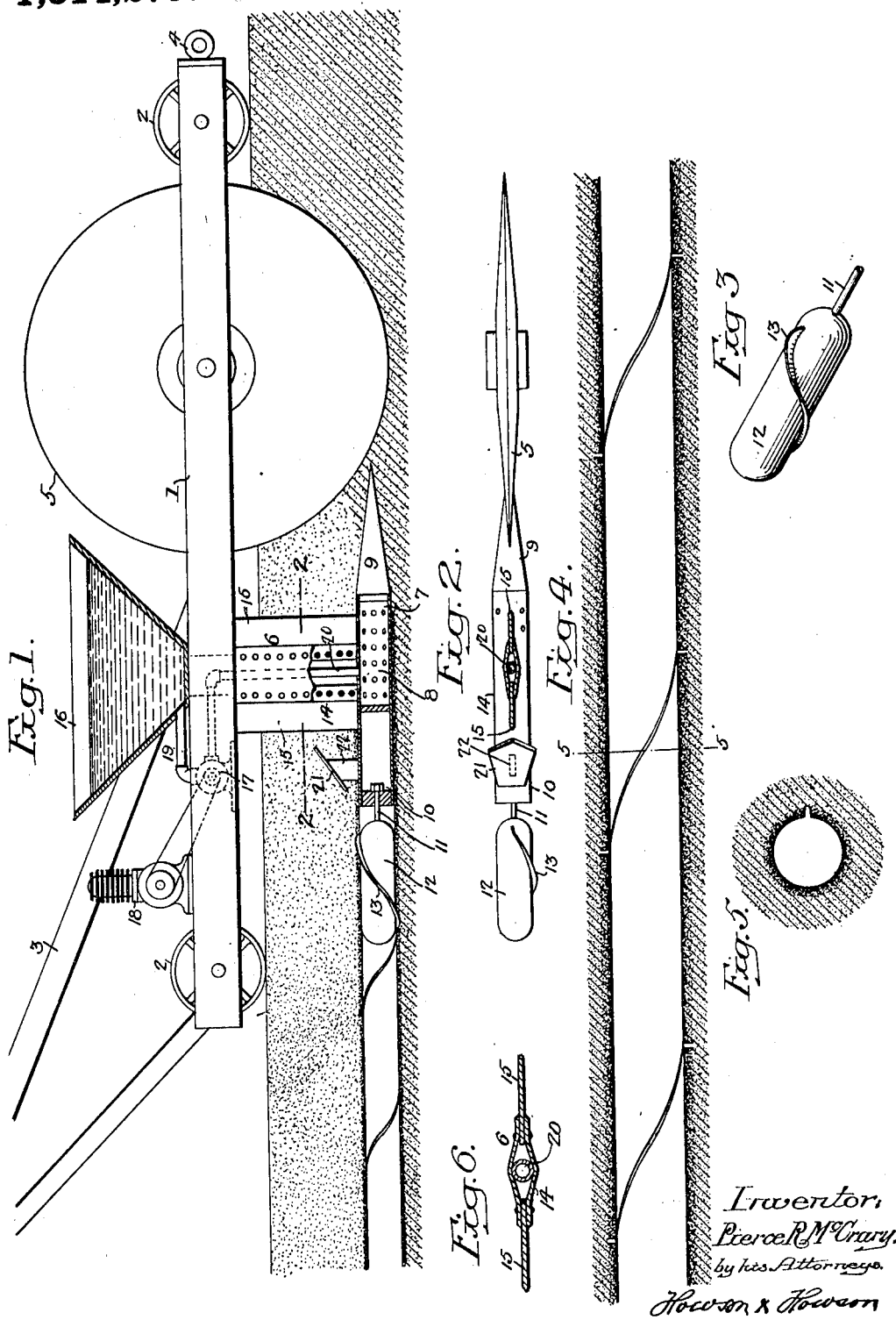
Inventor,
Pierce R. McCrary.
by his Attorneys
Howson & Howson

UNITED STATES PATENT OFFICE.

PIERCE R. McCRARY, OF LAKELAND, FLORIDA, ASSIGNOR OF ONE-HALF TO CHRISTOPHER H. R. WOODWARD, OF PORTSMOUTH, NEW HAMPSHIRE.

PROCESS OF MAKING DRAIN-TILES.

1,314,279.

Specification of Letters Patent. Patented Aug. 26, 1919.

Application filed December 11, 1918. Serial No. 266,269.

*To all whom it may concern:*

Be it known that I, PIERCE R. McCRARY, a citizen of the United States, and a resident of Lakeland, county of Polk, State of Florida, have invented certain Improvements in Processes of Making Drain-Tiles, of which the following is a specification.

My invention relates to certain improvements in the method of laying underground tiles, used for drainage, irrigating or for sewage.

One object of my invention is to form the tile underground by mixing a given quantity of cement and water with the sand in which the tile is to be laid.

A further object of the invention is to make the opening in the ground for the tile and at the same time to provide drainage openings in the tile as it is formed.

A still further object of the invention is to provide an apparatus for carrying out the process.

In the accompanying drawings:

Figure 1 is a side view of my improved apparatus for making tile underground, the ground being in section and showing the formed tile;

Fig. 2 is a sectional plan view of the apparatus on the line 2—2, Fig. 1;

Fig. 3 is a perspective view of the swiveled former having the helical blade which cuts the helical drainage grooves in the tile;

Fig. 4 is a longitudinal sectional view through a tile made in accordance with my invention;

Fig. 5 is a transverse sectional view on the line 5—5, Fig. 4, and

Fig. 6 is an enlarged sectional plan view on the line 2—2, Fig. 1, showing the connection between the frame and the tubular forming tool.

I will first describe the apparatus for carrying out my improved process.

1 is a frame having supporting wheels 2 at each end, which rest on the ground and keep the frame at the proper level. 3, 3 are the handles of the type of the ordinary plow handles. 4 is an eye or clevis to which can be attached a team of horses or power tractor, if desired. 5 is a cutter wheel, which is comparatively sharp so as to cut the ground to the depth which it is desired to lay the drainage tile and the opening is of sufficient width to allow the connection 6, as well as the forming tool to be drawn through the ground to the depth required. It will be understood that my invention is adapted for forming tiles in comparatively light soils, particularly in soils having a large proportion of sand, as I utilize the sand of the soil to aid in forming the tile.

The former 7 is shaped as clearly shown in Figs. 1 and 3, and has a perforated body portion 8, a point 9 and a perforated rear extension 10 closed at the end, and extending through an opening in this closed end is a swivel 11 for the rotating former 12 having a spiral blade 13 so that as the main former 7 is pushed forward the former 12 will rotate and will finish the interior of the tile. The connection 6 is made as clearly shown in Fig. 6, having a central portion 14 through which the pipe 20 extends, and front and rear extensions 15 preferably provided with beveled edges.

17 is a pump and 18 is an internal combustion engine, in the present instance mounted on the frame for driving the pump. The pump has a pipe 19 communicating with the lower portion of the hopper 16 in which is a mixture of cement and water; and a pipe 20 extending through the connection 6 and communicating with the interior of the former 7 so that a given amount of water and cement will be provided at the former for thoroughly mixing the sand and the cement. This water, with the cement that enters the former, will be projected through the perforations in the former, due to the pressure of the pump, so that the mixture will pass to the outside of the former and will penetrate the sand through which the former is passing to a given depth, the rear end of the former being plain will finish the interior of the tube, which is partly formed, and the rotating former will not only smooth the tube, but will also cut a helical groove therein for the passage of the drainage water into the tile, when drainage tiles are being formed. In time the concrete thus formed will harden, and a tube will be made having a smooth interior and a rough exterior. The thickness of the tile will depend considerably upon the pressure and the character of the ground in which it is formed. It will be understood that the size of the tile may be varied by varying the diameter of the former 7.

I preferably provide a covering device consisting of an inclined blade 21 mounted on a support 22 carried by the rear end of the former 7 and this blade is so proportioned that it will cut into the sand above the former, throwing down sufficient sand to close the opening back of the connection 6. This, in many instances, will cause the walls to avalanche and entirely close the opening.

The operation is as follows:

If it be desired to lay drainage tiles in sandy soil for the purpose of draining the water from the surface, then this machine is available and can be used without first digging a trench and placing previously formed sectional tiles in the trench. It will be understood that the present method of laying drainage tiles is exceedingly expensive, due to the manual labor required. The apparatus shown in the drawings can be drawn, as hereinbefore stated, either by horses or a traction engine, and the former for the tiles can be arranged at any depth desired by using a certain length of connection between the former and the frame. The cutting wheel can also be of any diameter or may, in some instances, be adjustable so as to cut into the sand to the depth required. The cement and water are placed in the hopper and thoroughly mixed and when combined with the sand will be of a proper consistency to form a tile, when allowed to set and harden. When the apparatus is moved forward the wheel 5 cuts the slot to the depth desired and the connection and the tool travel through the slot. The mixture of water and cement passes out through the perforations in the former 7, making a cement wall surrounding the former which is partly finished by the plain section of the former and is smoothed by the rotating former 12, which at the same time cuts a helical groove in the wall, as shown in Fig. 5. This groove is of sufficient depth to pass through the cement and form a passage through which the drainage water can flow into the tile. After the apparatus has passed through the ground, the walls of the ditch formed by the wheel will fall and will close the opening.

Thus, I am enabled to make a continuous drain tile in the ground at a very low cost, which will be satisfactory and will thoroughly drain the ground in close proximity to it.

While I have described my invention adapted particularly as a process for making drain tiles, it will be understood that the invention can be used in making irrigating tiles, or sewage tiles, or pipe. In the latter case, the rotating cutter is dispensed with.

I claim:

1. The process herein described of making tubular tiles, said process consisting in first forming a ditch in the ground and simultaneously forcing a former through the ground near the bottom of the ditch and admitting to the former a mixture of cement and water, allowing the cement and water to mix with the sand through which the former is forced so as to produce a shell of cement which, when hardened, forms a tube below the surface of the ground.

2. The process herein described of forming tubular tiles in the ground, said process consisting in first cutting a ditch to the proper depth in the ground; shaping the ditch in the form of a tile to be formed; then admitting cement and water to the former portion of the ditch and mixing the cement and water with the sand of the ground and finally cutting a groove in the formed tile to allow the water to percolate therethrough and drain the surrounding earth.

3. The process herein described of making tubular tiles in the ground, said process consisting in first cutting a ditch in the ground; forcing a former through the ditch below the ground; allowing the cement and water to flow into the ditch through the former and to mix with the sand of the surrounding earth, forming a concrete shell; shaping and grooving the shell by a rotating former which, as it rotates, cuts a helical groove in the walls of the shell for the passage of drainage water.

4. The combination in apparatus for forming tiles under-ground, of a frame; a disk wheel for cutting a ditch in the ground; a former on a line with the base of the wheel; a connection between the former and the frame; a hopper for a mixture of cement and water; means for feeding the mixture to the former, said former being perforated to allow the cement and water to escape and mix with the surrounding sand.

5. The combination in apparatus for forming tiles under-ground, of a frame; a disk wheel for cutting a ditch in the ground; a former on a line with the base of the wheel; a connection between the former and the frame; a hopper for a mixture of cement and water; means for feeding the mixture to the former, said former being perforated to allow the cement and water to escape and mix with the surrounding sand, and a rotating former directly back of the main former, said rotating former having a helical blade for cutting a spiral groove in the shell of formed concrete.

6. The combination of a frame; wheels for supporting the frame on the ground; handles for guiding the frame; a disk wheel for cutting a ditch in the ground; a hopper on the frame; a former directly below the hopper; a connection between the former and the hopper, the former having a point at one end and also having a perforated section; and a plain section, and a pump connected to the hopper and to the former.

7. The combination of a frame; wheels for supporting the frame on the ground; a cutting disk for cutting a ditch in the ground; a hopper back of the cutting disk; a former located on a line with the bottom of the cutting disk, said former having a point at the forward end; a perforated section and a plain rear section; a connection between the hopper and the former; a rotating former having a helical rib thereon for forming a helical groove in the formed concrete tube; a pump; a motor for driving the pump, and pipes leading from the hopper to the pump and from the pump to the former so that as the frame is moved forward the mixture of cement and water will be admitted to the former and will escape from the former and will mix with the sand, producing a concrete tube.

8. The combination in apparatus for forming tiles under-ground, of a frame; a cutting wheel mounted on the frame for cutting a ditch for the tile; a hopper; a former located in the ditch back of the cutting wheel; a connection between the hopper and the former, and a covering blade located above the former and back of the connection so as to throw down the sand after a tube has been made by the former.

In witness whereof I affix my signature.

PIERCE R. McCRARY.

Copies of this patent may be obtained for five cents each, by addressing the "Commissioner of Patents, Washington, D. C."